(12) United States Patent
Bune

(10) Patent No.: US 6,760,320 B1
(45) Date of Patent: Jul. 6, 2004

(54) CHANNEL ADAPTIVE FAST POWER CONTROL IN CDMA

(75) Inventor: Paul A. M. Bune, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/295,392

(22) Filed: Apr. 21, 1999

(30) Foreign Application Priority Data

Apr. 12, 1999 (EP) .......................................... 99440072

(51) Int. Cl.[7] .......................................... H04B 7/216
(52) U.S. Cl. ................................. 370/342; 370/335
(58) Field of Search ............................... 370/342, 343, 370/344, 346, 255, 319, 311, 310, 335; 375/130, 227; 455/517, 522, 452, 515

(56) References Cited

U.S. PATENT DOCUMENTS

| | | | | |
|---|---|---|---|---|
| 5,257,283 A | * | 10/1993 | Gilhousen | |
| 5,574,747 A | | 11/1996 | Lomp | |
| 5,995,538 A | * | 11/1999 | Lomp | 375/208 |
| 6,169,731 B1 | * | 1/2001 | Stewart | 370/332 |
| 6,175,586 B1 | * | 1/2001 | Lomp | 375/130 |
| 6,292,519 B1 | * | 9/2001 | Popovic | 375/346 |
| 6,330,272 B1 | * | 12/2001 | Lomp | 375/147 |
| 6,334,047 B1 | * | 12/2001 | Andersson | 455/69 |
| 6,337,989 B1 | * | 1/2002 | Agin | 455/522 |
| 6,341,225 B1 | * | 1/2002 | Blanc | 455/522 |
| 6,343,206 B1 | * | 1/2002 | Miya et al. | 455/69 |
| 6,347,083 B1 | * | 2/2002 | Nishino | 370/342 |
| 6,373,823 B1 | * | 4/2002 | Chen | 370/252 |
| 6,381,445 B1 | * | 4/2002 | Ue | 455/69 |
| 6,405,021 B1 | * | 6/2002 | Hamabe | 455/69 |
| 6,430,398 B1 | * | 8/2002 | Blanc | 455/67.3 |
| 6,493,541 B1 | * | 12/2002 | Gunnarsson | 455/69 |
| 6,529,482 B1 | * | 3/2003 | Lundby | 370/252 |
| 6,597,894 B1 | * | 7/2003 | Ue | 455/69 |
| 6,611,676 B2 | * | 8/2003 | Ue | 455/69 |

OTHER PUBLICATIONS

J. M. Rulnick et al, "Mobile Power Management for Wireless Communication Networks", Wireless Networks, vol. 3, No. 1, Mar. 1, 1997 pp. 3–14 XP000688197.

P–R Chang et al, "Adaptive Fuzzy Power Control for CDMA Mobile Radio Systems", IEEE Transactions of Vehicular Technology, vol. 45, No. 2 May 1, 1996 pp. 225–236 XP000598092.

"CDMA—Priniciples of Spread Spectrum Communication", andrew J. Viterbi 1998, Addison–Wesley, p. 182–183.

UMTS W–CDMA, ETS XX.03, Version 1.0.0 (Dec. 1998), Section 5.2.1 (p. 6), Section 5.3.1 (p. 9).

UMTS W–CDMA, ETX XX.07, Version 1.0.0 (Dec. 1998), Section 4.1.1 (p. 5), Section 4.2.1 ( p. 6).

* cited by examiner

Primary Examiner—Douglas Olms
Assistant Examiner—Ricardo M. Pizarro
(74) Attorney, Agent, or Firm—Sughrue Mion, PLLC

(57) ABSTRACT

The invention relates to a method of channel-adaptive power control. According to the invention, the method makes it possible to control the transmission power in a channel-adapting way, employing an arbitrary large set of different TPC algorithms (TPCAs) for use. Each TPCA should be well adapted to a special kind of channel characteristics. The set of TPCAs is all the better performing when it covers the largest scale possible of channel characteristics. At any time, the transmission power is controlled by that algorithm chosen among the set of algorithms that appears to be optimal for the actual channel characteristics.

18 Claims, 2 Drawing Sheets

CHANNEL ADAPTIVE FAST POWER CONTROL IN CDMA

BACKGROUND OF THE INVENTION

The field of this invention is the digital radio communication. More precisely this invention relates to a method of channel-adaptive power control as claimed, to a CDMA transceiver device and to a digital CDMA radio communication system as claimed in the independent claims.

Power control method serves to adapt the transmission power of a transmitter in a base station or respectively in a mobile station according to information received from its communication counterpart the mobile station respectively the base station over the radio channel.

In CDMA systems all channel resources are allocated to all users simultaneously. On the one hand the "Near-Far"-effect must be properly compensated so that all mobile stations communicating with a base station have approximately the same contribution to the total received signal at the base station independently of their distance to the base station. On the other hand the mobile radio channel has a broad dynamic bandwidth. The characteristics depend directly on the behaviour of the mobile user and are typically affected by radio-link Doppler and Rayleigh-fading effects. Appropriate mechanisms have to be used to avoid connection degradation or loss due to a too high attenuation of the signal w.r.t. interference.

Under these conditions a fast and accurate power control is necessary to ensure an appropriate level of transmission quality for the users. At the same time power control maximises communication density levels in the system. For uplink, this is achieved if the Signal-to-Interference-Ratio (SIR) measured by a base station for each connected mobile station is kept as close as possible to a target Signal-to-Interference-Ratio (SIRtarget).

In prior art e.g. "CDMA—Principles of Spread Spectrum Communication", Andrew J. Viterbi 1998, Addison-Wesley, Page 182–183, uplink power control has been realised with an open loop power control scheme or with a closed loop control scheme.

In the open loop control scheme a mobile station is tracking a pilot signal sent by the base station while receiving and transmitting traffic. The power level of the pilot signal is in relation with the SIRtarget value and is known by the mobile station. The downlink path loss can then be estimated at any time. Assuming that the physical channel is completely symmetrical, the downlink path loss is the same as the uplink path loss and the mobile station can deduce at any time the appropriate transmission power it has to use.

A closed loop power control takes into account that the dynamical part of propagation loss is not symmetric, since Rayleigh fading depends strongly on the carrier frequency, which may differ considerably in the two directions. In that case the transmission power is based on periodical measurements made at the receiving (base or mobile) station. These measurements lead to an estimation of the SIR of the signal received. SIR sampling is done once per 0.625 ms timeslot as specified in UMTS W-CDMA, ETSI XX.03, Version 1.0.0 (December 1998), Section 5.2.1 (Page 6) for uplink, Section 5.3.1 (Page 9) for downlink. The receiving station compares the estimated SIR with SIRtarget and generates according to an algorithm a Transmit Power Control (TPC) command indicating to which extent the counterpart station has to raise or to lower its actual transmission power. This TPC command is sent back to the counterpart station over a signalling channel. The counterpart station modifies its transmission power in the way indicated by the TPC command. The generation of TPC commands is also done once per 0.625 ms timeslot as specified in UMTS W-CDMA.

In prior art an algorithm named "bang-bang" algorithm is used to generate TPCs. It is specified in UMTS W-CDMA, ETSI XX.07, Version 1.0.0 (December 1998), Section 4.1.1 (Page 5) for uplink, Section 4.2.1 (Page 6) for downlink. It simply compares for each sampling instance the estimated SIR with the SIRtarget and generates a binary TPC value equal to "up" if the sign of the difference SIRtarget-SIRestimated is positive and to "down" if the sign of the difference is negative. The way of modifying the transmission power is quantified: a Transmission Power Step value (TPS) is fixed. Upon reception of the TPC message, the mobile station converts the value "down" into the indication "reduce transmission power by TPS dB" and the value "up" into the indication "increase transmission power by TPS dB".

Disadvantages of closed loop power control combined with "bang-bang" algorithm are especially detected in urban environments where the mobile channel shows such fast attenuation variations that the loop delay—induced by the measurement in the base station, the TPC command generation, its transmission to the mobile station and the power tuning of the transmitter—causes a noticeable probability that the TPC command at its point of arrival at the transmitter in the mobile station is obsolete. E.g., suppose that the base station considers the received power level to be too high, thereupon generating a TPC command "down" in order to let the mobile station reduce its transmission power. When this TPC command arrives at the transmitter in the mobile station, the attenuation over the radio channel between the base station and the mobile station may have increased to such an extent, that the SIR has dropped below the SIRtarget before the TPC comes into effect. In this case, when the TPC becomes effective, it actually causes the SIR to deviate further from its target value rather than reducing the power error.

In order to reduce these effects, which tend to decrease the potential user capacity in CDMA networks considerably, predictive algorithms could be advantageous but not sufficient. Indeed, such predictive algorithms should be well adapted to one type of channel characteristics, but under other type of channel characteristics, their predictions might deviate considerably from the real appearing values.

SUMMARY OF THE INVENTION

It is an object of the invention to provide a method of improving power control in making it possible to control the transmission power in a channel adapting form.

These objects are attained by the features of the independent claims respectively by offering an arbitrary large set of different TPC algorithms (TPCAs) for use. Each TPCA should be well adapted to a special kind of channel characteristics. The set of TPCAs is all the better performing when it covers the largest scale possible of channel characteristics. At any time the transmission power is controlled by the algorithm chosen among the set of algorithms that appears to be optimal for the actual channel characteristics. This method takes advantage of the right algorithm at the right time.

Further advantageous features of the invention are defined in the dependent claims.

Especially an algorithm using a first and second threshold is well adapted to a channel affected by Rayleigh fading.

BRIEF DESCRIPTION OF THE DRAWING

The invention will become more apparent from the following description of several embodiments when taken in conjunction with the accompanying drawing in which.

DETAILED DESCRIPTION OF THE INVENTION

Figure 1:
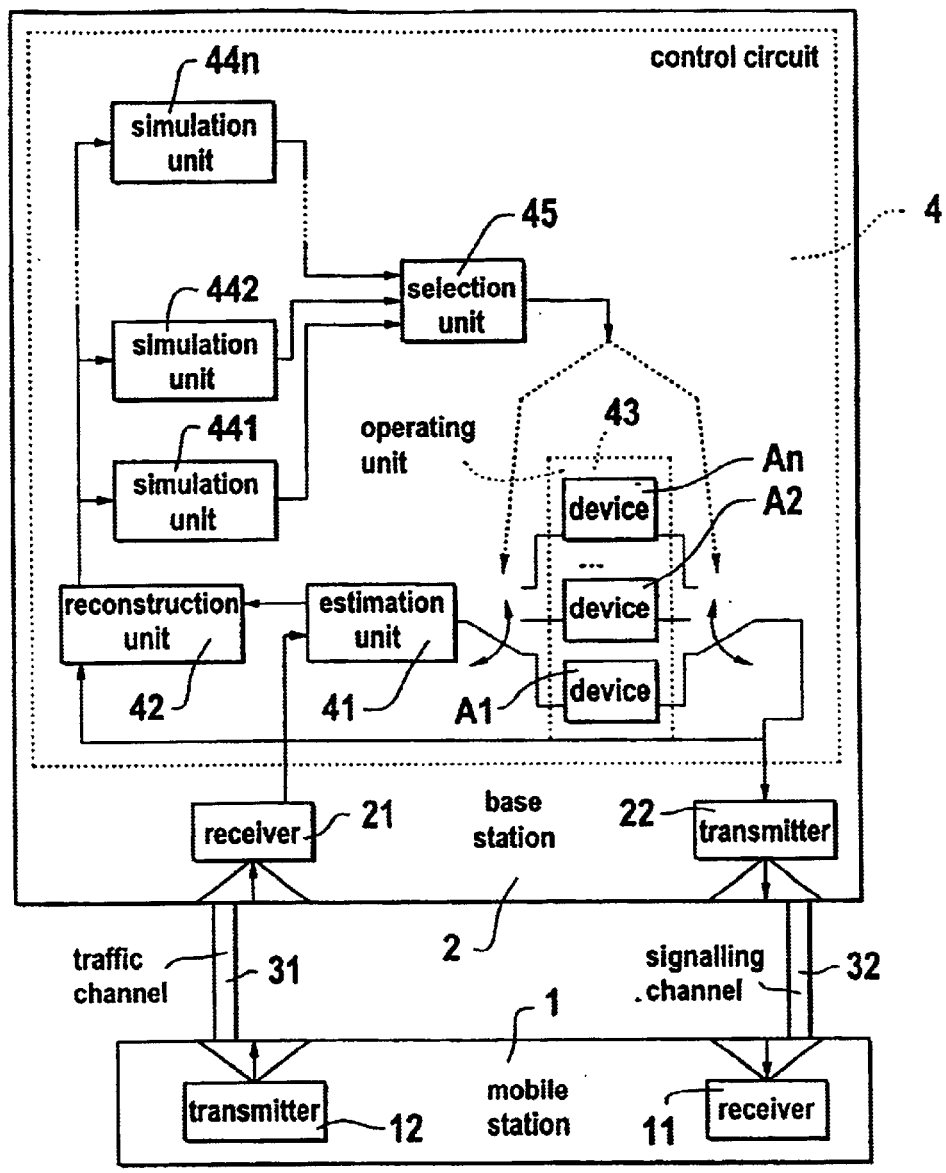
FIG. 1 shows two transceivers of a digital CDMA radio communication network communicating with each other in one direction over traffic channel and realising power control.

The digital CDMA radio system shown in FIG. 1 is composed of a device A 1 and a device B 2. For the description of this example device A is a mobile station 1 and device B is a base station 2. Both devices are composed of a transmitter 12,22 and of a receiver 11,21. The mobile station 1 with the transmitter 12 sends out a traffic information with transmission power $STX_i$ at the sampling instance i. The information enters the base station 2 and the receiver 21 over a radio communication traffic channel 31. The transmitter 22 of the base station sends signalling information to the receiver 11 of the mobile station 2 on a signalling channel (32). In the base station 2 the receiver 21 is connected to a control circuit 4 for realising improved power control. The task of the control circuit 4 is to take the received signal from the traffic channel 31 and to generate a transmission power control command $TPC_i$ at sampling instance i at the output. The control circuit 4 is connected to the transmitter 22 of the base station. The $TPC_i$ is sent by the transmitter 22 of the base station to the receiver11of the mobile station 1 over the signalling channel 31.

In the next timeslot of the CDMA-transmission a new $TPC_i$ is computed and sent out.

The new transmission power at sampling instance i+1 ($STX_{i+1}$) at the transmitter 12 of the base station is calculated as follow:

$$STX_{i+1} = STX_i * TPC_i.$$

The control circuit 4 for realising improved power control is composed by an estimation unit 41 connected to the receiver 21 and a operating unit 43. The output of the operating unit 43 is connected to the input of the transmitter 22 of the base station 2. The estimation unit 41 and the output of the operating unit 43 are connected in a second line to the input of a reconstruction unit 42 which is over parallel simulation units 441 . . . 44n connected to a selection unit 45. The selection unit has a trigger line to switch switches 3, 3".

- a estimation unit 41 responsible for SIR estimation obtained at each sampling instance as follows: signal power received over the traffic channel by the receiver of the base station $SRX_i$ divided by interference power at device B's receiver part $IRX_i$:

$$SIR_i = SRX_i / IRX_i.$$

- an operating unit 43 composed of n algorithms A1, A2, . . . , An. At sampling instance i, in FIG. 1, A1 is the operative algorithm and controls the TPC generation. $TPC_i$ is used to regulate the transmission power of device A's transmitter part. The other algorithms are at sampling instance i inactive regarding the generation of a TPC to regulate the transmission power of the base station.

- a reconstruction unit 42 responsible for reconstructing in real time the channel behaviour. The channel behaviour is characterised by the evolution over the time of the absolute channel loss $ACL_i$ defined at each step as follows:

Signal transmission power at the mobile station 1 $STX_i$ divided by the power of the same signal at the base station after attenuation by the radio channel $SRX_i$ $$ACL_i = STX_i / SRX_i.$$

The reconstruction unit 42 takes as input the value of the measured SIR given by the estimation unit 41 and the value of the TPC command generated by the operating unit 43.

The result of the real time channel reconstruction operated by the reconstruction unit 42 is stored at each sampling instance i in n memories for further use.

- n simulation units 441,442 . . . 44n each of them responsible for the simulation and the validation of one algorithm. The n simulation units 441, . . . , 44n are running simultaneously and independently of each other. They generate virtual TPCs (VTPCs) in parallel. These VTPCs are just used for simulation purpose. They don't influence directly the power control since they are not transmitted to the mobile station 1. Note that the operative algorithm can also be simulated and validated this way.

- a selection unit 45 responsible for the selection of the best algorithm according to the common quality criterion. If the best algorithm is different of the operative algorithm, the selection unit also triggers the switching of switches 3 between the operative algorithm at step i and the best algorithm which becomes the operative algorithm at step i+1.

Figure 2:
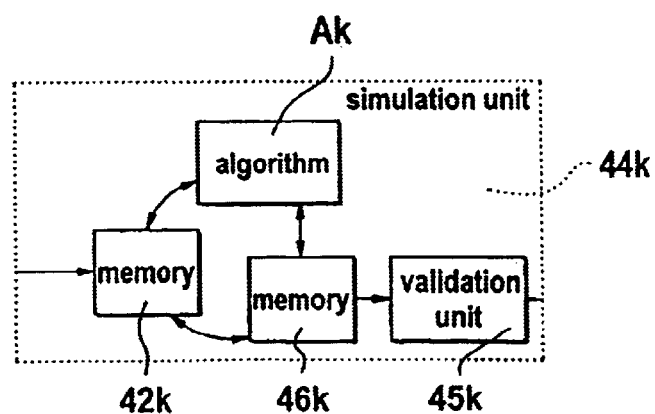
FIG. 2 shows the simulation and evaluation unit and FIG. 3 includes a flowchart showing steps of the method for realising power control in accordance with the invention.

At each step i, the simulation unit 44k for the algorithm Ak as shown in FIG. 2 consists of:

- a first memory 42k where channel information is stored at each sampling instance i by the reconstructing unit 42.
- a computing unit Ak' computing at step i the VTPC according to the algorithm Ak (VTPCk,i).
- a second memory 46k where at each sampling instance i, the virtual SIR information reconstructed by the simulation of the algorithm Ak (VSIRk,i) is stored
- a validation unit 45k validating the results provided by the simulation of the algorithm Ak with a quantitative quality evaluation based on a common quality criterion for all algorithms. This quantitative quality evaluation indicates how well the sequence of VTPCk,i generated by the algorithm Ak enables it to keep the sequence of VSIRk,i close to SIRtarget under the current channel conditions. The validation is done by the n units in parallel providing the n quantitative quality evaluations instantaneously.

In the embodiment of the invention being described, one TPCA represented by its instances A1 and A1' is the "bang-bang" algorithm.

| | |
|---|---|
| $TPC_i = +TPS$ dB | if $SIR_i < SIR_{target}$ |
| $TPC_i = -TPS$ dB | if $SIR_i > SIR_{target}$ |

Another TPCA represented by its instances A2 and A2' is especially performing for a channel affected by Rayleigh fading phenomenon. It deviates from the standard "bang-bang" algorithm by sending a "down" TPC command when the following situation occurs: the measured SIRi is below SIRtarget, but above another constant threshold SIR, called "pre-braking SIR" (SIR$_{pb}$), and SIRi is detected to be increasing by at least a minimum rate (e.g. dpb dB per control cycle, where dpb can be positive, zero or negative)

| | |
|---|---|
| TPC$_i$ = −TPS dB | if SIR$_i$ > SIR$_{target}$ or (SIR$_i$ > SIR$_{pb}$ and SIR$_{i-1}$ + dpb < SIR$_i$) |
| TPC$_i$ = +TPS dB | otherwise |

As it can be regarded as to perform "braking" of the upward movement of the SIR by reversing the TPC commands before the desired SIR level has been reached, it could be named the positive slope pre-braking (PSPB) algorithm.

One variation of the PSPB algorithm is to detect a decrease of the ACL value instead of an increase of the SIR value.

| | |
|---|---|
| TPC$_i$ = −TPS dB | if SIR$_i$ > SIR$_{target}$ or (SIR$_i$ > SIR$_{pb}$ and ACL$_{i-1}$ + dpb > ACL$_i$) |
| TPC$_i$ = +TPS dB | otherwise |

Variation of ACL are given by the unit responsible for reconstructing in real time the channel behaviour. It can also be directly obtained if the transmission power is transmitted over the signalling channel from the mobile or base station The other TPCAs represented by their instances A3, A3' . . . An, An' can be predictive or non-predictive algorithms. The degree in which the TPCAs differ from each other can be variable, e.g. it is possible that a part or the whole set of algorithms are identical with the exception of one or more parameters having different numerical values, but also completely different algorithms can be operated in parallel. One is not restricted to one class of algorithm.

Figure 3:
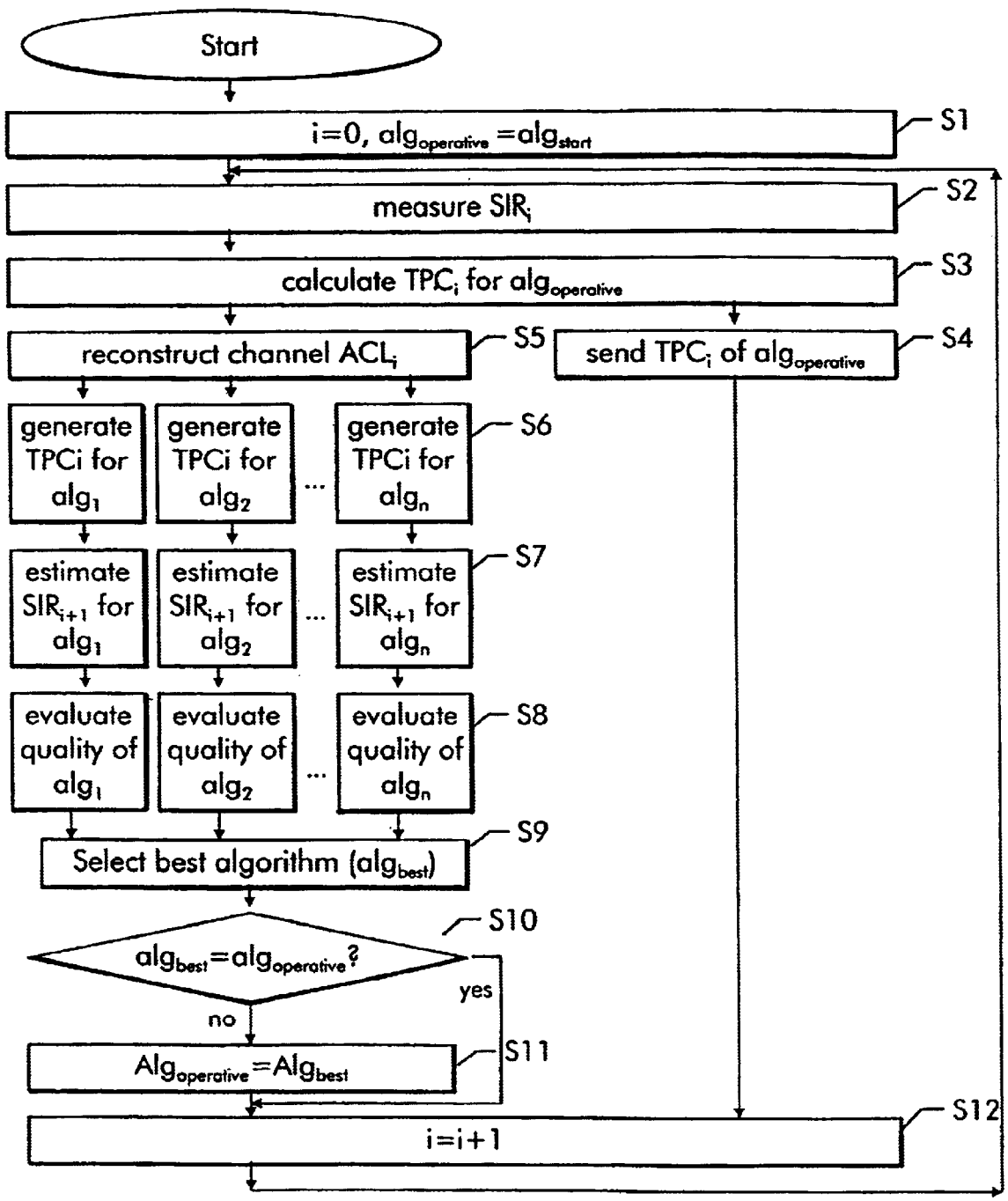

An embodiment of the method according to the invention for realising improved power control is shown as a flowchart in FIG. 3. The method comprises the following steps:

Step S1: Initialisation of the parameters. An operative algorithm is chosen as start algorithm according to an external criterion among the set of available algorithms.

Step S2: The signal received on the traffic channel is measured. An evaluation of SIRi at sampling instance i is done.

Step S3: According to the operative algorithm TPCi is generated at sampling instance i.

In the following, the step S4 on the one hand and the steps S5 to S11 inclusive on the other hand are executed in parallel.

Step S4: TPCi generated by the operative algorithm is sent over the signalling channel back to device A.

Step S5: The image of the channel at sampling instance i is reconstructed. In the configuration shown in FIG. 1, the channel behaviour can be derived from the only information available at the base station 2: −SIRi given by the estimation unit 41

TPCi generated by the operative algorithm if it is assumed that IRXi is constant for each i:

$ACLi+1/ACLi=STXi+1/STXi*SRXi/SRXi+1=TPCi*SIRi/SIRi+1.$

Using the reconstructed channel value, the behaviour of all algorithms is simulated in parallel.

Step S6: the value VSIRk,i derived at each step i from VSIRk,i−1,VTPCk,i−1,ACLi−1 and ACLi according to the following formula:

$VSIRk,i/VSIRk,i-1=VTPCk,i-1ACLi-1/ACLi$ for $1<=k<=n$

Step S7: VTPCk,i is generated for each algorithm Ak at sampling instance i. The simulated algorithm Ak uses as input the value VSIRk,i to generate VTPCk,i.

$VTPCk,i=Ak(VSIRk,i)$ for $1<=k<=n$

Step S8: A quality evaluation is done for each algorithm according to a common quality criterion. All Algorithms are validated in the same way, for example their quality is measured as the averaged square error Qk of VSIRk,i w.r.t. SIR$_{target}$. Here, optimal quality is reached when the numerical value of $Q_k$ is minimal:

$$Q_k = av((SIR_{target} - VSIR_{k,i})^2) = n^{-1}\sum_{i=0}^{n-1}(SIR_{target} - VSIR_{k,i})^2$$

Step S9: The algorithm meeting the best the quality criterion is selected.

Step S11: If the selected algorithm is not equal to the operative algorithm, the operative algorithm is replaced by the selected algorithm, else nothing is changed.

Step S12: The step number is incremented and the process starts again at Step S2.

The invention is not restricted to a base station which is able to handle alternative algorithms. It is also possible that a mobile station has all necessary means to adapt TPC in the inventional way.

The whole circuit can be integrated in a single module with a processor able to process incoming data.

The invention is not restricted to a method which send TPC in every time slot. It is possible to send the TPC the next timeslot after a measurement. In some cases it is sufficient to adapt the power in a lower frequency.

The decision to switch the operative algorithm to another can be taken immediately after an algorithm with a better quality has been detected. The decision can also be taken due to a defined threshold. Only if the quality of an algorithm is above this threshold the switching will be triggered.

Another possible solution is to take the decision if an algorithm has been the best one during a certain time.

What is claimed is:

1. A method of controlling the power transmitted by a unit in a digital CDMA radio transmission system using a closed loop power control scheme based on an operative algorithm which generates commands to adapt the transmitted power according to the channel characteristics, comprising:

(a) processing at least one competitive algorithm different from said operative algorithm;

(b) evaluating a performance of all said algorithms according to a common quality criterion; and (c) replacing the operative algorithm by one of said competitive algorithms if the latter shows better performance.

2. A method of controlling the power transmitted by a unit in a digital CDMA radio transmission system using a closed loop power control scheme based on an operative algorithm which generates commands to adapt the transmitted power according to the channel characteristics, comprising:

(a) processing at least one competitive algorithm different from said operative algorithm;

(b) evaluating a performance of all said algorithms according to a common quality criterion; and (c) replacing the operative algorithm by one of said competitive algorithms if the latter shows better performance, wherein the competitive algorithms are provided with information about the radio channel and simulate a behavior of each algorithm by computing simultaneously and independently of each other individual Transmission Power Control (TPC) commands.

3. The method of claim 2, wherein the common quality criterion determines in which extent the TPC commands generated by an algorithm enables it to approach a target transmission quality in the CDMA radio transmission system, while minimizing the transmitted power.

4. The method of claim 3, wherein a best fitting algorithm (Ak) is determined according to the common quality criterion and a switching between algorithms is triggered, the best fitting algorithm (Ak) becomes the operative algorithm, while the former operative algorithm is maintained as a competitive algorithm.

5. A method of controlling the power transmitted by a unit in a digital CDMA radio transmission system using a closed loop power control scheme based on an operative algorithm which generates commands to adapt the transmitted power according to the channel characteristics, comprising:

(a) processing at least one competitive algorithm different from said operative algorithm;

(b) evaluating a performance of all said algorithms according to a common quality criterion;

(c) replacing the operative algorithm by one of said competitive algorithms if the latter shows better performance; and (d) using an algorithm for processing a measured Signal-to-Interference Ratio (SIR measured) in relation to a first threshold (SIR threshold) to generate a Transmission Power Control (TPC) command, wherein a decrease of the transmitting power is required when the measured Signal-to-Interference Ratio (SIR measured) is increasing with a gradient above a defined threshold gradient and the measured Signal-to-Interference Ratio (SIR measured) is above a second threshold (pre-braking SIR).

6. A method of controlling the power transmitted by a unit in a digital CDMA radio transmission system using a closed loop power control scheme based on an operative algorithm which generates commands to adapt the transmitted power according to the channel characteristics, comprising:

(a) processing at least one competitive algorithm different from said operative algorithm;

(b) evaluating a performance of all said algorithms according to a common quality criterion;

(c) replacing the operative algorithm by one of said competitive algorithms if the latter shows better performance; and (d) using an algorithm for processing a measured Signal-to-Interference Ratio (SIR measured) and an estimated Absolute or Relative Channel Loss (ACL measured, RCL measured) in relation to a first threshold (SIR threshold) to generate a Transmission Power Control (TPC) command, wherein a decrease of the transmitting power is required when the Absolute or Relative Channel Loss (ACL measured, RCL measured) is decreasing with a gradient below a defined threshold gradient and the measured Signal-to-Interference Ratio (SIR measured) is above a second threshold (pre-braking SIR).

7. A digital radio communication system based on CDMA comprising:

(a) at least one transmitter;

(b) at least one receiver; and (c) a controller controlling a transmission power, wherein an estimation unit (41) measures and processes a channel signal, a reconstruction unit (42) provides a pure channel information, an operating unit (43) generates Transmission Power Control commands, n simulation units (441 . . . 44n) compute a set of competitive algorithms, and a selection unit (45) activates one algorithm out of the set of the competitive algorithms.

8. A transceiver device for a digital CDMA radio communication channel comprising a control circuit (4) for controlling a transmission power, wherein an estimation unit (41) measures and processes a channel signal, a reconstruction unit (42) provides a pure channel information, an operating unit (43) generates Transmission Power Control commands, n simulation units (441 . . . 44n) compute a set of competitive algorithms, and a selection unit (45) activates one algorithm out of the set of the competitive algorithms.

9. The transceiver device of claim 8, wherein said transceiver device is comprised in a mobile station.

10. The transceiver device of claim 8, wherein said transceiver device is comprised in a base station.

11. A digital radio communication system based on CDMA comprising:

(a) at least one transmission means;

(b) at least one reception means;

(c) a control means for controlling a transmission power, (d) an estimation means for measuring and processing a channel signal;

(e) a reconstruction means for providing a pure channel information;

(f) an operation means for generating Transmission Power Control commands;

(g) n simulation means for computing a set of competitive algorithms; and (h) a selection means for activating one algorithm out of the set of competitive algorithms.

12. The digital communication system of claim 11, wherein the selection means activates the algorithm providing optimal power control.

13. A transceiver device for a digital CDMA radio communication channel comprising:

(a) a control means for controlling a transmission power;

(b) an estimation means for measuring and processing a channel signal;

(c) a reconstruction means for providing a pure channel information;

(d) an operation means for generating Transmission Power Control commands;

(e) n simulation means for computing a set of competitive algorithms; and (f) a selection means for activating one algorithm out of the set of competitive algorithms.

14. The transceiver device of claim 13, wherein the selection means activates the algorithm providing optimal power control.

15. A method of controlling the power transmitted by a unit in a digital CDMA radio transmission system using a closed loop power control scheme based on an operative algorithm which generates commands to adapt the transmitted power according to the channel characteristics, comprising:

(a) processing at least one competitive algorithm different from said operative algorithm;

(b) evaluating a performance of all said algorithms according to a common quality criterion; and (c) replacing the operative algorithm by one of said competitive algorithms if the latter shows better performance, wherein the evaluation of the performance of all said algorithms, according to a common quality criteria, occurs in parallel.

16. The method of claim 1, wherein the operative algorithm is replaced by a competitive algorithm immediately after determining that the competitive algorithm shows better performance than the operative algorithm and any other competitive algorithms.

17. The method of claim 1, wherein the operative algorithm is replaced by a competitive algorithm that shows better performance than the operative algorithm and any other competitive algorithms only if a quality of the competitive algorithm exceeds a predetermined threshold.

18. The method of claim 1, wherein the operative algorithm is replaced by a competitive algorithm that shows better performance than the operative algorithm and any other competitive algorithm only if the competitive algorithm shows the best performance for a predetermined period of time.

* * * * *